United States Patent [19]

Vogt et al.

[11] Patent Number: 4,547,664
[45] Date of Patent: Oct. 15, 1985

[54] DIFFRACTION GRATING BEAM SPLITTER IN A LASER RESONATOR LENGTH CONTROL

[75] Inventors: Peter Vogt, Heidenheim; Horst Künzmann, Braunschweig, both of Fed. Rep. of Germany

[73] Assignee: Carl-Zeiss-Stiftung, Oberkochen, Fed. Rep. of Germany

[21] Appl. No.: 480,821

[22] Filed: Mar. 31, 1983

[30] Foreign Application Priority Data

Apr. 6, 1982 [DE] Fed. Rep. of Germany ....... 3212809

[51] Int. Cl.[4] ................................................ G01J 1/32
[52] U.S. Cl. .................... 250/205; 250/225; 372/32
[58] Field of Search ........... 250/205, 550, 225, 237 R; 372/32, 102, 106; 350/162.2; 356/318, 354

[56] References Cited

U.S. PATENT DOCUMENTS

| | | | |
|---|---|---|---|
| 3,392,400 | 7/1968 | Lamberts et al. | 350/162.2 |
| 3,588,738 | 6/1971 | Goodwin | 372/106 |
| 3,650,595 | 3/1972 | Gerritsen et al. | 350/162.2 |
| 4,314,211 | 2/1982 | Mollenauer | 372/32 |
| 4,474,467 | 10/1984 | Hardy et al. | 356/354 |

FOREIGN PATENT DOCUMENTS 3003467 8/1980 Fed. Rep. of Germany ... 350/162.2

*Primary Examiner*—David C. Nelms
*Assistant Examiner*—J. Gatto
*Attorney, Agent, or Firm*—Hopgood, Calimafde, Kalil, Blaustein & Judlowe

[57] ABSTRACT

The invention contemplates a beam splitter which consists of a phase grating (5) which transmits at zero order the greatest part of the radiation of a two-mode laser (1) and which diffracts a relatively small part of the radiation, symmetrically at 1 order and −1 order, respectively. The intensity of components of the radiation polarized perpendicular to each other and associated with the two modes is measured by detectors (11, 12) in front of which polarization sheets (9, 10) are arranged as analyzers, and outputs of the detectors are used to regulate the center frequency of the laser tube (1).

5 Claims, 1 Drawing Figure

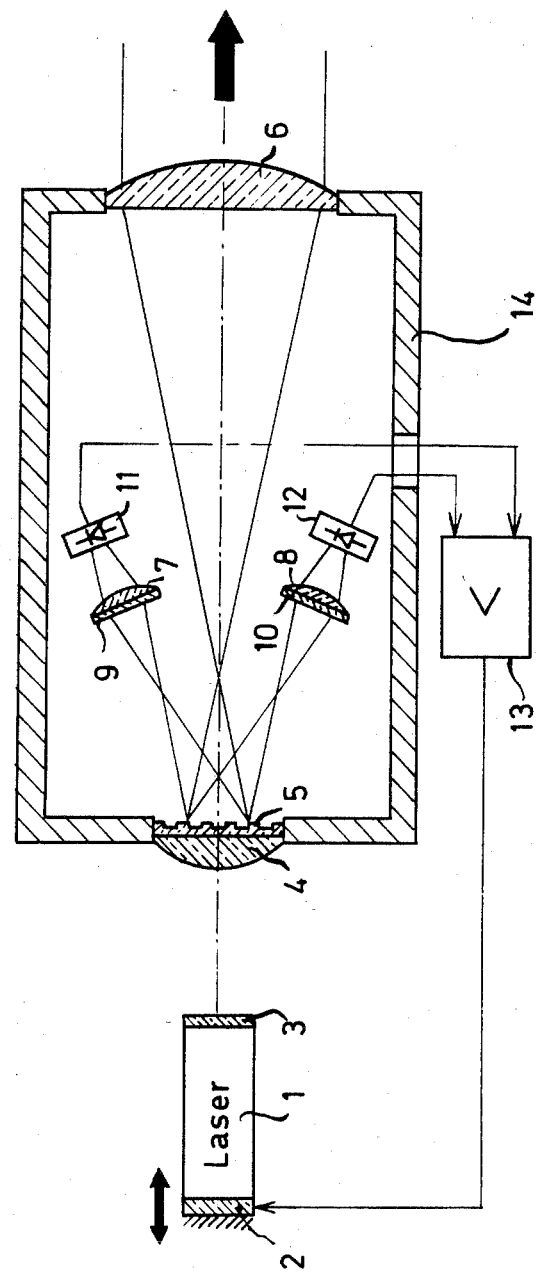

DIFFRACTION GRATING BEAM SPLITTER IN A LASER RESONATOR LENGTH CONTROL

BACKGROUND OF THE INVENTION

The invention relates to a beam splitter for detecting the ratio of differently polarized components of a substantially monochromatic radiation.

Such beam splitters are required, for instance, in devices for stabilizing the frequency of lasers which oscillate in more than one mode, in order to be able to determine the intensity ratio of the modes present with different polarization, and use the intensity ratio to regulate resonator length in the laser.

Known devices for stabilizing the frequency of lasers, such as those described in German Pat. Nos. 2,043,734 and 2,053,246, so utilize the second output of the laser tube to be stabilized that the low-intensity and generally unused partial beam which there emerges is split into its differently polarized components by a polarization splitter, for example, a Wollaston prism. This second output of the laser tube is, however, not present or accessible in any tube available on the market.

To derive differently polarized components through coupling to the useful beam of the laser, it is also known from German Pat. No. 2,043,734 to arrange two Brewster plates, at an angle of 90° apart, within the useful beam. Such a construction, however, has several disadvantages. On the one hand, the coupling factor, and thus the intensity of the derived partial bundle, is fixed, i.e., the intensity reduction in the useful beam which passes through may be too great. Furthermore, the parallel displacement of this beam by the Brewster plates results in adjustment problems. Finally, the plates must be very well coated to avoid reflection, so that multiple reflections cannot occur within the plate.

U.S. Pat. No. 3,588,738 describes a beam splitter for the above-mentioned purpose, consisting of a semi-transmitting mirror inclined at an angle of 45° to the useful beam and a Wollaston prism arranged beyond the mirror. Such decoupling has the disadvantage that, due to phase shifts, linearly polarized light striking the semi-transmitting mirror layer is converted into elliptically polarized light. Furthermore, the intensity of the two decoupled partial beams which are polarized perpendicular to each other differs, depending on the angle which the surface of the splitter forms with the directions of polarization of the incident components.

BRIEF STATEMENT OF THE INVENTION

The object of the present invention is to provide a beam splitter for detection of the ratio of differently polarized partial bundles of substantially monochromatic radiation, such beam splitter being of the simplest and most compact construction and causing least possible disturbance of the useful beam.

The invention achieves this object by having the radiation strike a diffraction grating which supplies the greatest part of the zero-order intensity and by providing devices which select the polarization direction, said devices being positioned at angular regions associated with higher orders of diffraction.

The required grating can be so adapted as to step height that, for example, only that part of the incident radiation which is required for measurement purposes is diffracted at higher orders, while the useful beam leaves the grating unimpeded at zero order.

The advantage of such a beam splitter is that, when using the grating, the useful beam remains unaffected by depolarizing influences, and unaffected by disturbing reflections which are introduced in known beam splitters. Advisedly, the transmissionphase grating which is used, is applicable directly to a component which is already present in the beam path, for example, a lens which serves to expand the beam of the laser, thereby presenting no additional boundary surfaces to produce reflections which would otherwise have to be removed.

As a rule, since two components polarized perpendicularly to each other are to be coupled out by means of the beam splitter, it is advantageous to select a grating which has a symmetrical groove profile with respect to the incident direction and which, in addition to the zero order, scatters essentially only at one higher order, for example, at first order, symmetrically to both sides of the useful beam. In the two angular regions associated with these diffraction orders, two detectors, connected for differential evaluation of their outputs, can then be arranged behind analyzers, which are cross-polarized with respect to each other, so that these detectors enable measurement of the intensity ratio of the polarized components.

DETAILED DESCRIPTION

An illustrative embodiment of the invention will be described in detail in conjunction with the accompanying drawing.

In the drawing, a so-called two-mode helium/neon laser 1 includes a resonator, defined by mirrors 2, 3. Within the resonator, two stable modes are established, differing only very slightly in their frequency but polarized perpendicular to each other. The beam which exits via mirror 3, and which accordingly consists of two differently polarized components, is expanded by planoconvex lenses 4 and 6, for interferometric measurement purposes.

A phase grating 5 is applied to the rear of the first planoconvex lens 4. Grating 5 transmits undiffracted, 80 percent of the intensity of radiation coming from laser 1 at a zero-order wavelength of 630 nm. Grating 5 has a grating constant of 5 $\mu$m and a rectangular groove profile.

About 10 percent of the incident-radiation intensity is diffracted by grating 5 at each of orders 1 and −1. Radiation at these orders falls on polarization sheets 9 and 10, respectively, applied to condenser lenses 7 and 8, respectively. These condenser lenses illuminate the light-sensitive surfaces of photoelectric receivers 11 and 12 respectively, so connected that their output signals can be used by a differential amplifier 13 to stabilize the length of the laser resonator and thus to stabilize the frequency. The parts 4 to 12 are combined in a common light-tight housing 14 to form an assembly.

What is claimed is:

1. In combination, a laser having a resonator emitting a laser beam, means for varying the length of the resonator, a beam expander comprising at least two lens elements, a diffraction grating on one of said lens elements, said grating transmitting at zero order nearly all of the beam intensity emitted from the resonator, and said grating diffracting from the relatively small remainder of the beam intensity at two higher orders and into two different regions offset from the path of zero-order transmission, cross-polarized analyzers positioned in the respective different regions, and means including separate detectors behind the respective analyzers and producing an electrical signal operatively connected to stabilize laser-beam frequency by correctively varying the length of the resonator.

2. The combination of claim 1, characterized by the fact that the grating is a transmission grating.

3. The combination of claim 1, characterized by the fact that the grating is a phase grating.

4. The combination of claim 1, characterized by the fact that the grating is a grating with symmetric groove profile which diffracts, in addition to the zero order, substantially only into plus and minus first orders.

5. The combination of claim 1, in which the two lens elements of said beam expander, the said diffraction grating, the said analyzers and the said detectors are all combined to form a single assembly.

* * * * *